United States Patent
Dobrynin et al.

(10) Patent No.: US 11,074,280 B2
(45) Date of Patent: Jul. 27, 2021

(54) CLUSTER BASED SEARCH AND RECOMMENDATION METHOD TO RAPIDLY ON-BOARD COMMANDS IN PERSONAL ASSISTANTS

(71) Applicant: AIQUDO, INC., San Jose, CA (US)

(72) Inventors: Vladimir Dobrynin, Saint Petersburg (RU); David Patterson, Jordanstown (GB); Niall Rooney, Belfast (GB)

(73) Assignee: AIQUDO, INC, Campbell, CA (US)

( * ) Notice: Subject to any disclaimer, the term of this patent is extended or adjusted under 35 U.S.C. 154(b) by 179 days.

(21) Appl. No.: 15/936,013

(22) Filed: Mar. 26, 2018

(65) Prior Publication Data

US 2018/0336269 A1 Nov. 22, 2018

Related U.S. Application Data

(60) Provisional application No. 62/580,444, filed on Nov. 1, 2017, provisional application No. 62/576,766, filed
(Continued)

(51) Int. Cl.
*G06F 16/00* (2019.01)
*G06F 16/33* (2019.01)
(Continued)

(52) U.S. Cl.
CPC .......... *G06F 16/3344* (2019.01); *G06F 9/451* (2018.02); *G06F 9/453* (2018.02);
(Continued)

(58) Field of Classification Search
CPC ............. G06F 16/34–35; G06F 16/345; G06F 16/355; G06F 16/367; G06F 16/93;
(Continued)

(56) References Cited

U.S. PATENT DOCUMENTS

| 7,185,001 | B1 * | 2/2007 | Burdick | ................ G06F 16/345 |
| 8,041,765 | B1 * | 10/2011 | Krishnaswamy | ....... G06F 3/165 |
| | | | | 709/204 |

(Continued)

FOREIGN PATENT DOCUMENTS

| EP | 3 200 185 A1 * | 8/2017 |
| WO | WO 2009/070193 A2 * | 6/2009 |

(Continued)

OTHER PUBLICATIONS

International Search Report and Written Opinion dated Aug. 9, 2018 in International Patent Application No. PCT/US18/33441, 9 pages.
(Continued)

*Primary Examiner* — Srirama Channavajjala
(74) *Attorney, Agent, or Firm* — Shook, Hardy & Bacon L.L.P.

(57) ABSTRACT

The present invention provides assistance to a user that is on-boarding an action for a virtual assistant. Methods and systems provide, based on an initial command group, recommendations for additional commands, actions, and applications that are relevant to commands included in the initial command group. The initial command group includes commands that include a sequence of natural language words or tokens. Additional commands are determined. The additional commands are relevant to the initial commands and provided to the user as recommended commands to include in the command group. The additional commands are determined by employing the initial commands as search queries to search preprocessed document clusters. Each document included in the document clusters relates to a potential command to include in the command group. In response to receiving a selection of a recommended command, the command group is updated to include the selected recommended command.

21 Claims, 9 Drawing Sheets

Related U.S. Application Data on Oct. 25, 2017, provisional application No. 62/539,866, filed on Aug. 1, 2017, provisional application No. 62/576,804, filed on Oct. 25, 2017, provisional application No. 62/509,534, filed on May 22, 2017, provisional application No. 62/508,181, filed on May 18, 2017.

(51) Int. Cl.
| | |
|---|---|
| *G06F 9/451* | (2018.01) |
| *G06F 16/93* | (2019.01) |
| *G06F 16/332* | (2019.01) |
| *G06F 16/242* | (2019.01) |
| *G06F 16/2457* | (2019.01) |
| *G10L 15/22* | (2006.01) |

(52) U.S. Cl.
CPC ...... *G06F 16/243* (2019.01); *G06F 16/24578* (2019.01); *G06F 16/3322* (2019.01); *G06F 16/3329* (2019.01); *G06F 16/93* (2019.01); *G10L 15/22* (2013.01); *G10L 2015/223* (2013.01)

(58) Field of Classification Search
CPC ............ G06F 16/3344; G06F 16/3322; G06F 16/3325; G06F 16/90332; G06F 16/3329; G06F 16/243; G06F 3/167; G06F 9/453; G06F 16/2423; G06F 16/24578; G06F 16/285; G06F 16/9535; G06F 9/451; H04L 51/18; G10L 15/22
See application file for complete search history.

(56) References Cited

U.S. PATENT DOCUMENTS

| | | | | |
|---|---|---|---|---|
| 8,140,526 | B1* | 3/2012 | Zhang | G06F 16/951 707/730 |
| 8,453,058 | B1 | 5/2013 | Coccaro et al. | |
| 8,775,409 | B1* | 7/2014 | Mehta | G06F 16/3322 707/713 |
| 8,813,127 | B2* | 8/2014 | Liu | G06F 16/4387 725/38 |
| 9,172,747 | B2* | 10/2015 | Walters | G06Q 30/02 |
| 2003/0154071 | A1* | 8/2003 | Shreve | G06F 16/93 704/9 |
| 2005/0055341 | A1* | 3/2005 | Haahr | G06F 16/3326 |
| 2007/0050191 | A1* | 3/2007 | Weider | G10L 21/06 704/275 |
| 2008/0189074 | A1* | 8/2008 | Lin | G06F 16/345 702/181 |
| 2009/0089047 | A1* | 4/2009 | Pell | G06F 40/30 704/9 |
| 2011/0137921 | A1* | 6/2011 | Inagaki | G06F 16/3347 707/749 |
| 2011/0302162 | A1 | 12/2011 | Xiao et al. | |
| 2013/0085848 | A1* | 4/2013 | Dyor | G06Q 30/02 705/14.49 |
| 2014/0019119 | A1* | 1/2014 | Liu | G06F 40/10 704/9 |
| 2014/0074454 | A1* | 3/2014 | Brown | G10L 15/22 704/9 |
| 2014/0237425 | A1* | 8/2014 | Chan | G06F 3/0482 715/810 |
| 2015/0066476 | A1* | 3/2015 | Midmore | G06F 40/20 704/9 |
| 2015/0088514 | A1* | 3/2015 | Typrin | G06F 3/167 704/249 |
| 2015/0172262 | A1 | 6/2015 | Ortiz, Jr. et al. | |
| 2015/0213355 | A1* | 7/2015 | Sharma | G06F 3/167 706/11 |
| 2015/0278678 | A1* | 10/2015 | Sharma | H04W 12/0802 706/11 |
| 2016/0044380 | A1* | 2/2016 | Barrett | H04N 21/812 725/53 |
| 2016/0063989 | A1* | 3/2016 | Deleeuw | G10L 15/02 345/473 |
| 2016/0179787 | A1* | 6/2016 | Deleeuw | G06F 40/289 704/9 |
| 2016/0360039 | A1* | 12/2016 | Sanghavi | H04L 51/046 |
| 2017/0032257 | A1 | 2/2017 | Sharifi et al. | |
| 2017/0109356 | A1 | 4/2017 | Sawal et al. | |
| 2017/0364804 | A1* | 12/2017 | Beller | G06N 5/04 |

FOREIGN PATENT DOCUMENTS

| | | | |
|---|---|---|---|
| WO | WO 2015/187584 | * | 12/2015 |
| WO | WO 2016/144983 | * | 9/2016 |

OTHER PUBLICATIONS

International Preliminary Report on Patentability dated Nov. 28, 2019 in International Patent Application No. PCT/US2018/033441, 8 pages.

Partial European Search Report and Opinion received for European Patent Application No. 18801977.2, dated Apr. 23, 2021, 17 pages.

* cited by examiner

CLUSTER BASED SEARCH AND RECOMMENDATION METHOD TO RAPIDLY ON-BOARD COMMANDS IN PERSONAL ASSISTANTS

CROSS-REFERENCE TO RELATED APPLICATIONS

This application is related by subject matter to and claims the benefit of U.S. Provisional Patent Application No. 62/508,181, filed May 18, 2017, entitled "SYSTEMS AND METHODS FOR CROWDSOURCED ACTIONS AND COMMANDS," U.S. Provisional Patent Application No. 62/509,534, filed May 22, 2017, entitled "CONNECTING MULTIPLE MOBILE DEVICES TO A SMART HOME ASSISTANT ACCOUNT," U.S. Provisional Patent Application No. 62/576,804, filed Oct. 25, 2017, entitled "CONNECTING MULTIPLE MOBILE DEVICES TO A SMART HOME ASSISTANT ACCOUNT," U.S. Provisional Patent Application No. 62/539,866, filed Aug. 1, 2017, entitled "OPTIMIZING DISPLAY ENGAGEMENT IN ACTION AUTOMATION," and U.S. Provisional Patent Application No. 62/576,766, filed Oct. 25, 2017, entitled "A CROWDSOURCED DIGITAL ASSISTANT SYSTEM," and U.S. Provisional Patent Application No. 62/580,444, filed Nov. 1, 2017, entitled "AUTOMATED METHOD TO CREATE DISCOURSES FROM USER COMMANDS," each of which is assigned or under obligation of assignment to the same entity as this application, the entire contents of each application being herein incorporated by reference.

BACKGROUND

Virtual assistants (VAs) have become ubiquitous in a variety of consumer electronic devices. VAs provide a (verbal or textual) conversational interface between users and applications running on electronic devices by employing speech recognition technologies, such as text-to-speech and speech-to-text technologies. That is, VAs may employ natural language processing (NLP) to detect a user's spoken or typed commands and execute a corresponding action. For instance, a user may ask, "What is the local weather forecast." The VA may detect the question via speech-to-text methods and determine a corresponding action and weather-reporting application via a command and action/application mapping. The VA may then initiate the execution of the action within the weather-reporting application. Upon the execution of the action, the VA may receive a weather forecast as textual data from the application. The VA may then "read" the weather forecast as spoken language via text-to-speech methods.

Natural language may include numerous ambiguities and multiplicities in sentence structure, terminology, and dialect. As such, each user may intend to trigger the same action via numerous natural language phrases. As an example, in a first instance, a user may ask a VA "what is the weather," while in a next instance, the user may ask the VA "can you provide the current weather." In both instances, the user intends to trigger the execution of the same action. Furthermore, separate users may employ numerous speech patterns and/or terms to trigger the same actions. For example, another user may simply command the VA to "provide the weather forecast," while expecting to trigger the same action.

Because of such ambiguities and multiplicities associated with natural languages, the generation of a map that correlates several natural language commands to a single action and application involves a significant amount of effort from a user. For instance, a user may manually "on-board" an action by manually associating various natural language commands to an action and corresponding application. However, such manual efforts by users may result in inconsistent or incomplete mappings of commands to actions and application. It is for these and other concerns that the following disclosure is provided.

SUMMARY

Embodiments of the present invention are directed towards providing assistance to a user that is on-boarding an action for a virtual assistant (VA). More particularly, the embodiments are directed to providing, based on an initial command group, recommendations for additional commands, actions, and applications to includes and/or associate with the command group, where the recommended commands, actions, and applications are relevant to initial commands included in the initial command group. Various methods for providing assistance to a user that is on-boarding an action includes receiving an initial command group that includes at least one initial command. For instance, the command may include a sequence of natural language words or tokens. Additional commands are determined. The additional commands are relevant to the initial commands and provided to the user as recommended commands to include in the command group. The additional commands may be determined by employing the initial commands as search queries to search preprocessed document clusters. Each document included in the document clusters includes and/or relates to a potential or possible command to include in the one or more additional commands. For instance, the title of the document may include the command that is related to the document. As discussed throughout, a document may include additional content that is contextually relevant to the document's related command. Determining the additional commands may be further based on a number of document clusters that are associated with co-occurring words that also occur in the initial commands. In response to receiving a selection of a recommended commands, the command group may be updated to include the selected recommended command.

It is possible that a command included in a particular document in a particular document cluster (i.e., a potential command), may be included in the one or more additional commands to be recommended. However, it is unlikely that a potential command included in a particular document in a particular cluster will be included in the additional commands to be recommended. The "relatedness" of many of these possible or potential commands to the one or more initial commands may be remote, and the potential command is not included in the one or more additional commands. For instance, the distance between an initial command and many possible or potential commands is relatively large. Such distant possible or potential commands are unlikely to be included in the one or more additional commands. As discussed throughout, in many embodiments, only a proper subset of the set of possible or potential commands is included in the one or more additional commands.

The method may further include determining a relevant command score for each recommended command. The command scores are based on a discounted cumulative gain (DCG) associated with the corresponding recommended command and a command included in the initially received command group. More specifically, the DCG score for each command is based on the order of the retrieved documents for each recommended command. A relevant command distance for each of the recommended commands is determined. The command distances are based on a Jensen-Shannon (JS) divergence for the corresponding recommended command and a command included in the initial command set. The JS divergence for a recommended command and a command included in the initial command set is the JS divergence between a document related to the recommended command and the command included in the initial command set. More specifically, the JS divergence between a command and a document is based on a distance between the command and the document. In various embodiments, the distance between an initial command and a document includes the distance between the command and the title and/or content in the body of the document. The relevant command scores and relevant command distances are provided to the user.

In some, but not all embodiments, the method may further include determining an action for each of the additional commands. Each determined action includes machine executable instructions. The determined actions are provided to the user as recommended actions to associate with the command group. A relevant action score may be determined for each determined action. The action scores are based on the command scores for the corresponding recommended commands. A relevant action distance for each action may be determined. The action distances are based on the command distances for the corresponding one or more additional commands. The relevant action scores and action distances are provided to the user. In some embodiments, an application for each of the actions is determined. The applications are enabled to execute the machine executable instructions included in the corresponding action. The applications are provided to the user as a recommended application to associate with the command group.

In other embodiments, rather than recommending an action or an application for a new command, the determined actions and applications are employed to provide better context to a user charged with onboarding an actions. The user may employ the determined action or applications for better context, and to determine a relevancy to the action being on boarded. For instance, relevant actions and relevant applications may be provided to assist the onboarder in making informed decisions about the relevancy of the recommended commands for a new command or a new command group. In various embodiments, providing the additional commands to the user reduces an onboarding error rate of the user.

DETAILED DESCRIPTION

Figure 1:
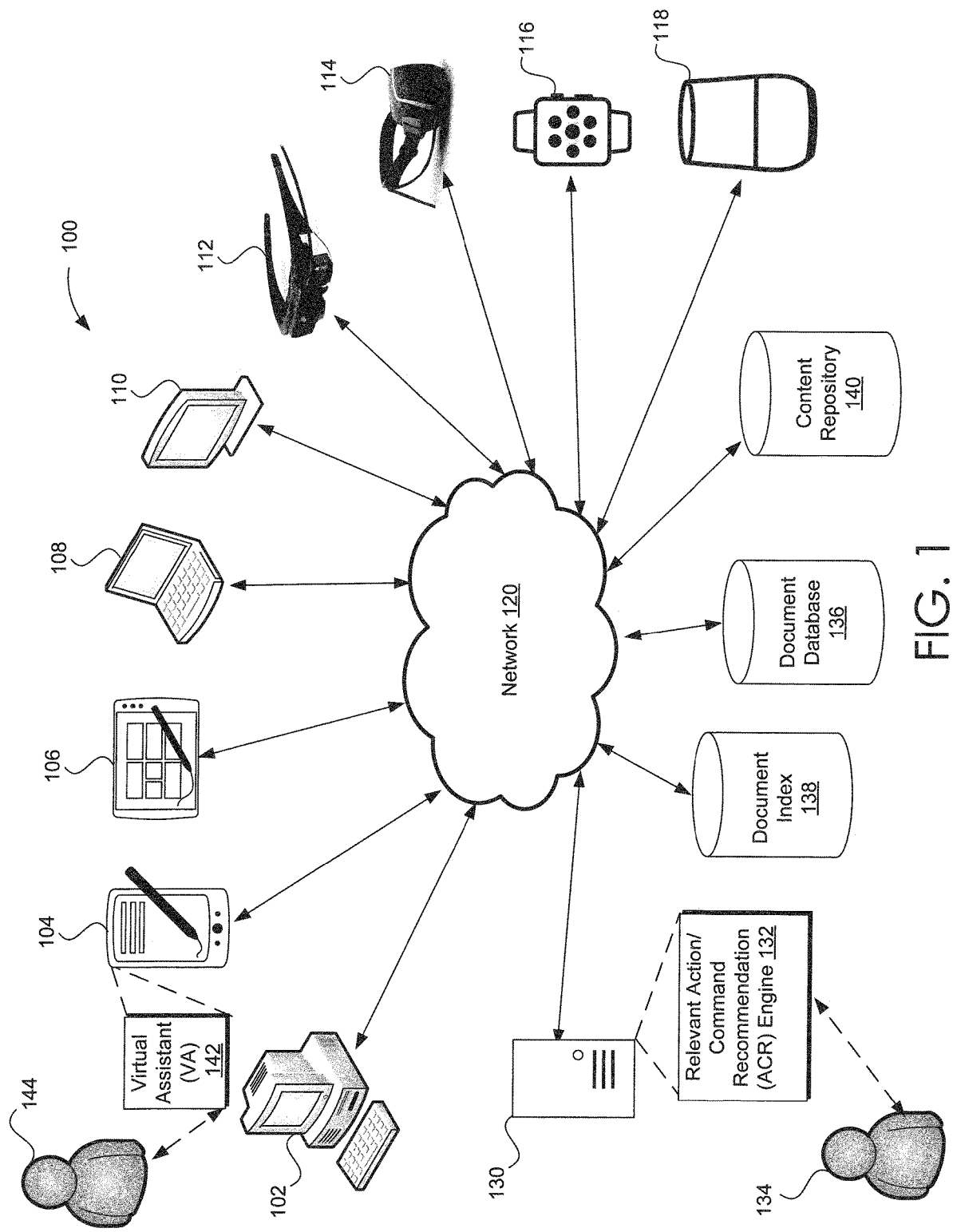
FIG. 1 illustrates a system 100 for assisting a user in the on-boarding of actions that is consistent with the various embodiments presented herein.

As used herein, the term "action" refers to one or more instructions or sequence of instructions that are executable via a machine application, such as but not limited to a mobile or a desktop application. Thus, an action may correspond to a specific application that is enabled to execute the one or more instructions included in the action. As a non-limiting example, a first action may correspond to a "weather" application, and include instructions. When the weather application executes the included instructions, the weather application provides a current weather forecast for the user's current location. A second non-limiting example of an action may correspond to a navigation application. When the navigation application executes the instructions of the second action, the navigation application provides navigation services to the user that navigates the user from their current location to a destination of interest.

As used herein, the term "command" refers to a natural language phrase, one or more sentences, one or more sentence fragments, or sequence of natural language tokens that may be mapped to an action and corresponding application. For instance, a first command "what is the weather," may be mapped to the above first action and the corresponding weather application. Note that more than one command may be mapped to a single action. The same command may be mapped onto multiple actions. A set of commands mapped to a single action may be referred to as a "command group" or "command set." For instance, a command group may include the three commands: "take me to the airport," "I want to drive to the airport," and "navigate to the airport," where each command in the command group is mapped to a single action and corresponding application. For example, this command group may correspond to, or be associated with, the above second action.

As used herein, the terms "virtual assistant" or "VA" may be interchangeable used to refer to any device, module, component, or engine that is enabled to detect a spoken or text-based command and initiate the execution of a corresponding, associated, or mapped action via the action's corresponding application. A VA may be enabled to provide any results or data generated by the execution of the action to a user that provided the associated command.

"On-boarding an action" (OBA) refers to a process of one or more users generating a mapping, correspondence, correlation, and/or association between commands, actions, and application. That is, on-boarding an action refers to a user defining, populating, generating, and/or updating a command group and associating the command group with an action and the corresponding application. Because of the inherent ambiguity and imprecise nature of natural languages, conventional methods for on-boarding actions are labor-intensive processes. That is, a user responsible for on-boarding an action may have to anticipate a significant number of terms, sentence structures, natural languages, dialects, jargon, named entities, and the like that other users may use when intending to trigger a specific action.

For example, a user responsible for on-boarding an action that provides airport navigation services would need to anticipate the numerous ways VA users may ask a VA for help navigating to an airport. The on-boarding user may expend a significant amount of time and effort populating a command group with a significant number of commands to cover the numerous ways VA users may ask for navigation services. Even with such efforts, an on-boarding user may not anticipate all the ways VA users may ask a VA for navigation services. Additionally, a user tasked with on-boarding an action may have difficulty identifying a navigation application and/or the sequence of instructions that a navigation application must execute to provide such navigation services. For instance, even though a user may anticipate populating a command group with the command "take me to the airport," the user may not easily identify a sequence of machine instructions, or even the application to execute the instructions, to provide such navigation services. As discussed throughout, the various embodiments are directed towards making the process of on-boarding new actions faster and easier with fewer errors, by recommending relevant existing commands to the on-boarding user.

As used herein, a "document" includes and/or relates to a possible command for one or more actions. In some embodiments, a document is related to a single action because the included command is related to a single action. In some embodiments, each document relates to a single command, single action-, and a single application. Any command may be related to different actions, but in separate documents. The possible commands may be associated with and/or related to previously onboarded actions corresponding to one or more applications. In some embodiments, the title of the document is the related command. In such embodiments, the related command is included in the document, by way of the document's title. In addition to the title including the related command, the document may include content that is contextually related to the command. For instance, the document may include textual content that provides semantic context for the command. The contextual content included in a document may have been included in one or more resources, such as but not limited to websites, articles, books, journals, online encyclopedias, user groups, and the like. That is, the contextual content may be sourced from virtually any resource that may include content that provides context to the related command. Various embodiments of sourcing contextual content from resources are discussed within U.S. Provisional Application 65/576,800, entitled AUTOMATED METHOD TO CREATE DISCOURSES FROM USER COMMANDS, and filed on Oct. 25, 2017, the contents of which are incorporated in their entirety by reference.

As such, the various here embodiments are directed towards relevant action and/or command recommendation (ACR) systems and methods. Briefly, such ACR systems and methods receive an initial or seed command and/or command group. The ACR systems and methods recommend additional commands and/or actions that are relevant to those commands included in the initial command group. The various embodiments may rank the recommended commands and actions via various relevancy metrics (e.g., command scores and/or command distances) and provide such metrics to a user. The user may update the initial command group by selecting one or more of the recommended relevant commands based on the relevancy metrics provided to the user. For example, a user may provide an ACR system an initial command group of a single command "take me to the airport." The ACR system may recommend additional relevant commands, such as but not limited to "find best route to the airport," "I want to go to the airport," "find best wat to airport," directions to the airport," "navigate to the airport," and the like. One or more metrics may be provided for each recommended relevant command. The user may automatically update the initial command group by selecting one or more recommend commands to include in the command group.

In some embodiments, the ACR systems and methods additionally provide action and application recommendations that are relevant to the initial seed command group. For instance, the embodiments may provide an already on-boarded action (and its associated command group) that provides airport navigation services based on the initial command group. The user may update the command group based on the recommended action. That is, the user may associate the initial command group with the recommended action and/or incorporate at least a portion of a previously generated command group for the recommended action into the initially provided command group. For instance, a single command may be associated with the recommended action. In various embodiments, one or more relevant applications may be recommended to the user based on the initial command and/or command group. For example, when a user provides an ACR system the initial command "take me to the airport," the ACR system may recommend a specific navigation application to the user and/or one or more already on-boarded actions for the specific application that are relevant to the initial command and/or command group. Corresponding relevancy metrics for the recommended actions and applications may also be provided to the user. In some embodiments, the relevant actions and applications are provided only to provide the onboarding user with context of the recommended commands, i.e., which actions and applications the recommend commands are from.

In various embodiments, a document database is generated, wherein each document is associated with a command. In one non-limiting example, the title of the document includes the natural language phrase that is the associated command. That is, the title of the document may be the command. Various online repositories or resources may be mined and/or accessed to retrieve natural language sentences, sentence fragments, sequences of words, phrases terminologies, jargons, or other textual content to provide context to commands. A document may include the contextual content. The content may be the document body. The title of the document may be the related command. For instance, websites, applications, dictionaries, crowd-sourced encyclopedias, or other online resources may be accessed to retrieve contextual content that includes various natural languages phrases or sentences that relate to a command. Such accessed online repositories may include repositories of previously on-boarded actions and the associated command groups. Documents are generated, wherein each document includes the associated and/or corresponding command or a potential or possible command. Each document may also include an associated and/or corresponding action and application, as well as the contextual content (i.e., the document body) and the related command (i.e., the document title). For instance, a document may include, or be titled, the command "take me to the airport." The document may also include an action, or at least a reference to an action, and the corresponding application, that corresponds to the command "take me to the airport." The document may additionally include the content discovered for the document body that relates to the command. The generated documents may be included and/or stored in the document database. Such a collection of generated documents may be a document corpus.

Various machine learning (ML) methods are employed to generate a natural language model (NLM) from the generated document database. For instance, various unsupervised clustering methodologies may be employed to generate clusters of documents. The generation of document clusters may enable topic extraction, semantic enhancement, categorization, context understanding, word sense, and semantic disambiguation of the commands associated with, or included in, the documents. For instance, upon determining one or more clusters that a document may be statistically associated with, the semantics or meaning of the command associated with the document may be reliably inferred. A knowledge graph of commands may be constructed via the document clusters.

Various embodiments for generating document clusters are discussed in conjunction with U.S. Pat. No. 7,747,573 (the '573 patent), entitled COMPUTER AIDED DOCUMENT RETRIEVAL and issued on Jun. 27, 2010, the contents of which are herein incorporated by reference in their entirety. However, briefly here, each document included in a corpus of documents (e.g., a document database) may be embedded within a vector space. The vector space represents the set of all natural language terms, words, or tokens included in the corpus. The embedding or vector representing a particular document is based on the distribution of terms or words included in the document, i.e., the distribution of words included in the document's associated command (the document's title) and body (which includes content). The vector embedding of a document may encode a conditional probability or frequency distribution of words occurring in the associated command and body. The vector embedding of a document may encode a conditional probability or frequency distribution of words occurring in the associated command.

Based on the embedding of documents within a document corpus, document clusters may be determined via unsupervised machine learning methods. An attractor, i.e., an embedding within the vector space that encodes the cluster's position within the vector space, may characterize each document cluster. The vector encoding of a cluster's attractor represents a conditional probability distribution of co-occurring terms within commands (i.e., the document's title) and body (which includes content) associated with the documents that are likely to be included in the cluster. That is, a document cluster's attractor may indicate a narrow context. That is, the cluster's attractor may indicate a single context, i.e., a set of low entropy or narrow contexts, for the attractor. More specifically, a cluster may be characterized via a set of terms that are statistically likely to co-occur within documents included within the corpus.

The likelihood that a particular document is included within a particular document cluster is determined via a distance metric, i.e., the distance between the particular document's vector embedding and the cluster's attractor indicates a probability that the document is included within the cluster. In various non-limiting embodiments, the distance metric used to measure the distance between two such vector embeddings are the Jensen-Shannon (JS) divergence. Briefly, the JS divergence is a metric that measures the similarity between two probability distributions.

In various embodiments, in addition to an attractor, each cluster is characterized by a description. The description of an attractor or cluster includes a set of one or more descriptor terms. That is, the description of an attractor includes terms or words that may be included in the commands associated with the documents that are likely included in the cluster. The descriptor terms may be included in the body content document, related command that is the title of the document, or both in the body of the document and the title of the document. For instance, in some embodiments, the description terms may be included only in title of the document, or the body of the document, but not both the title and body document. In other embodiments, the descriptor terms are included in both the title and the body of the document. Various embodiments for determining a cluster description are discussed in U.S. Provisional Application 65/576,800, incorporated above.

Accordingly, in the various embodiments, each document associated with a command is embedded with a vector space and ML methods are employed to determine an attractor for each of a plurality of document clusters of the embedded documents. Because the documents include associated commands, commands may be clustered, wherein the clusters are characterized via a command context, i.e., the narrow context of the cluster's attractor. The clustering of the commands provides a natural language model that enables topic extraction, semantic enhancement, categorization, context understanding, word sense, and semantic disambiguation of the commands. The clustered documents may be indexed via a document index that preserves the vector embeddings of the documents and the structure of the document clusters. That is, the document index may index documents via the one or more clusters that the document likely is included in. Thus, a document included in the document index may be indexed via the vector embedding of the document and/or one or more document clusters that the document is likely to be included within. The document index may be employed by a search engine, where user provided commands are employed as search queries. The search results include documents that are associated with commands, actions, and applications. The associated commands, actions, and applications may be recommended as being relevant to the command employed as the search query. Various embodiments of retrieving documents via a search engine are discussed in conjunction with the '573 patent. However, briefly here, a command may be used as a search query. A command may be embedded within the vector space via the distribution of terms included in the command. Based on the command's embedding within the vector space, the document index may be used to retrieve documents (and thus associated commands, actions, and applications) that are embedded within a position of the vector space that are relevant (i.e., "close to") to the command's embedding.

More particularly, in the various embodiments, one or more commands included in an initial or seed command group may be employed as a search query. Documents may be retrieved from the document index based on various distance metrics, such as the JS divergence, for embedding of the search query command and the documents included in the document index. Each retrieved document is associated with a command, where the relevancy the retrieved command to the search query command is quantified via a command score and a command distance. The relevant commands may be recommended to the user to update the command group. As noted above, in addition to recommending commands, some embodiments may recommend actions and/or applications that are relevant to the search query command based on the recommended commands. As such, a user may employ such embodiments to assist in the process of on-boarding actions. For instance, by viewing such recommendations, the user may develop an understanding of the most popular terms, phrases, jargon, sentences, sentence structure, and the like that are relevant to various communities of VA users.

Example Operating Environment

FIG. 1 illustrates a system 100 for assisting a user in the on-boarding of actions that is consistent with the various embodiments presented herein. System 100 includes one or more of various user-computing devices, such as but not limited to desktop 102, smartphone 104, tablet 106, laptop 108, smart television (TV) 110, smart eyeglasses 112, virtual reality (VR) headset 114, smart watch 116, and virtual assistant (VA) device 118. Other embodiments may include additional and/or alternative user-computing devices. In other embodiments, system 100 may include more or less user-computing devices. For instance, system 100 may include additional mobile devices, wearable devices, and the like. Any user computing device, such as but not limited to user-computing devices 102-118 may be enabled to host, implement, and/or run a virtual assistant (VA). More specifically, a VA user may employ a user-computing device to receive the services of a VA. For instance, smartphone 104 is shown hosting VA 142 and VA user 144 is employing smartphone 104 to interact with VA 142.

System 100 may also include server-computing device 120. An exemplary, but non-limiting embodiment of a computing device is discussed in conjunction with at least computing device 700 of FIG. 7. That is, at least structures, functionalities, or features of computing device 700 may be included in any of user computing devices 102-118 and/or server computing device 116. On-boarding user 134 may be tasked or be responsible for on-boarding actions, as discussed herein. Server computing device 130 may be enabled to host, implement, and/or run a relevant action and/or command recommendation (ACR) engine 132. Various embodiments of an ACR engine are discussed in conjunction with relevant ACR engine 200 of FIG. 2A. However, briefly here, ACR engine 132 is enabled to assist on-boarding user 134 with the process of on-boarding an action by providing on-boarding user 134 recommendations for commands, actions, and applications, as well as updating a command group, as discussed herein.

System 100 includes content repository 140. Content repository 140 may be representative of various online repositories or resources that may be mined and/or accessed by ACR engine 132 to retrieve natural language sentences, sentence fragments, sequences of words, phrases terminologies, jargons, and the like that may be employed as commands. For instance, content repository 140 may include websites, applications, dictionaries, crowd-sourced encyclopedias, or other online resources which may be accessed via ACR engine 132 to retrieve content that includes various natural languages phrases or sentences that may be employed for commands. Content repository may include previously on-boarded actions, commands, and/or command groups.

System 100 may include document database 136. More specifically, ACR engine 132 may generate a corpus of documents from the content retrieved from content repository 140. The corpus of documents may be stored via document database 136. Each document stored in document database may include and/or correspond to (or be associated with) a command or a potential command, as discussed herein. Additionally, each document may include or be associated with an action and application that corresponds to the included command. System 100 may further include document index 138. As discussed herein, ACR engine 132 may generate document index 138 by clustering the documents included in document database, as described in the '573 patent. ACR engine 132 may further employ commands provided via on-boarding user 134 as search queries to search document index 138. ACR engine 132 may provide on-boarding user 134 with relevant commands, actions, and applications based on the search results.

A general or specific communication network, such as but not limited to communication network 120, may communicatively couple at least a portion of user-computing devices 102-118, server-computing device 120, document database 136, document index 138, and content repository 140. Communication network 120 may be any communication network, including virtually any wired and/or wireless communication technologies, wired and/or wireless communication protocols, and the like. Communication network 120 may be virtually any communication network that communicatively couples a plurality of computing devices and databases in such a way as to computing devices to exchange information via communication network 120.

Example Immersive Environment Engine

Figure 2A:
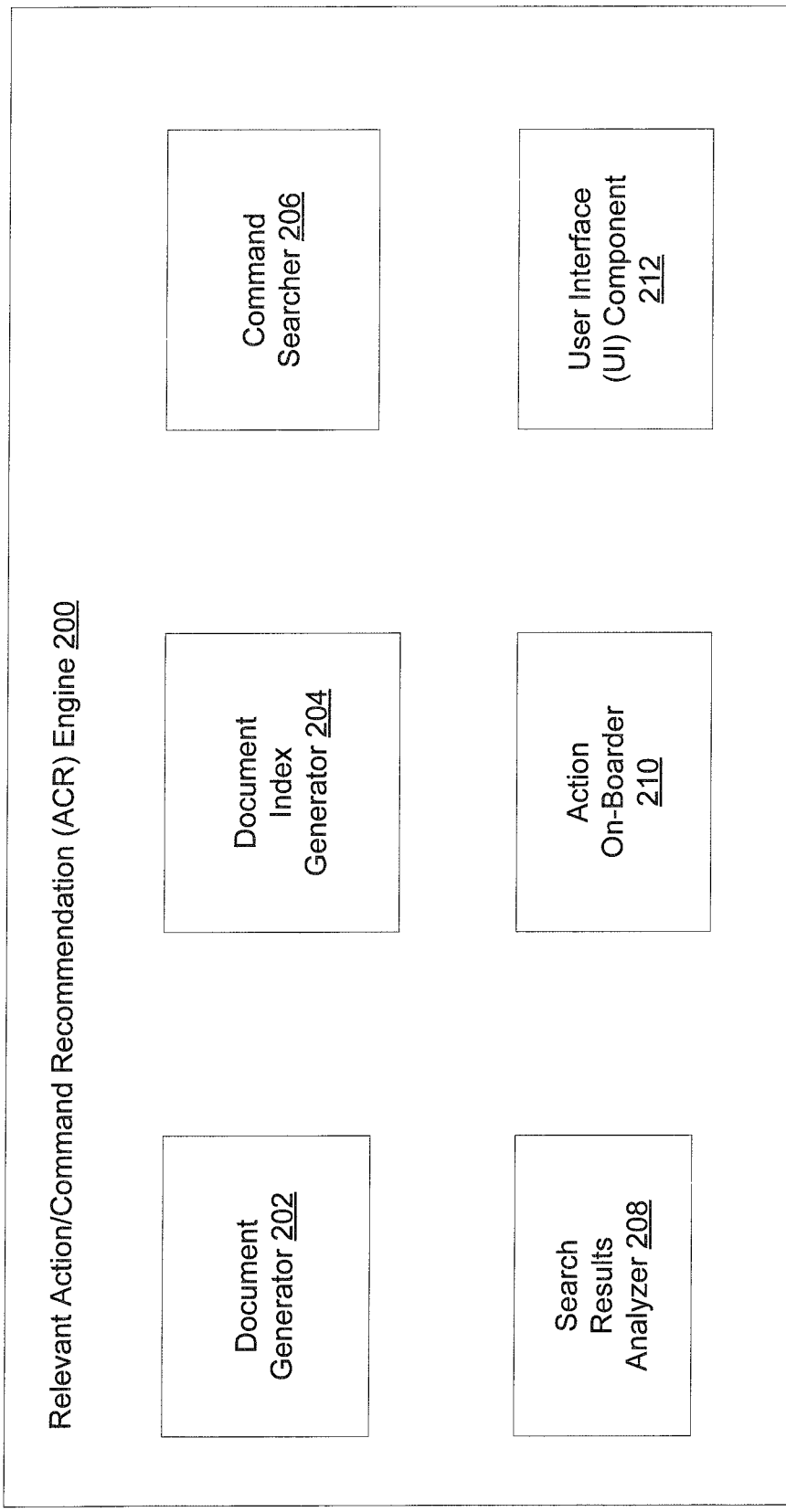
FIG. 2A illustrates one non-limiting embodiment of relevant action and/or command recommendation engine that is consistent with the embodiments herein.

FIG. 2A illustrates one non-limiting embodiment of relevant action and/or command recommendation (ACR) engine 200 that is consistent with the embodiments herein. ACR engine 200 is enabled to assist a user, such as but not limited to on-boarding user 134 of FIG. 1 in on-boarding actions. More specifically, ACR engine 200 is enabled to receive one or more initial commands, e.g., an initial or seed command group, from an on-boarding user, and provide relevant and/or recommended commands, actions, and applications to the on-boarding user. Based on user selections of the recommended commands, actions, and applications, ACR engine may update the initially provided command group.

To these ends, ACR engine 200 may include a document generator 202, a document index generator 204, and a command searcher 206. ACR engine 200 may further include at least one of a search results analyzer 208, an action on-boarder 210, and a user interface (UI) component 212. ACR engine 132 of FIG. 1 may include similar features, functionalities, operations, components, or modules to that of ACR engine 200. As discussed throughout, document generator 202 and document index generator 204 may perform many of their tasks or responsibilities via one or more offline processes. In contrast, command searcher 206, search results analyzer 208, action on-boarder 210, and UI component 212 may perform many of their tasks or responsibilities via one or more runtime processes.

Figure 2B:
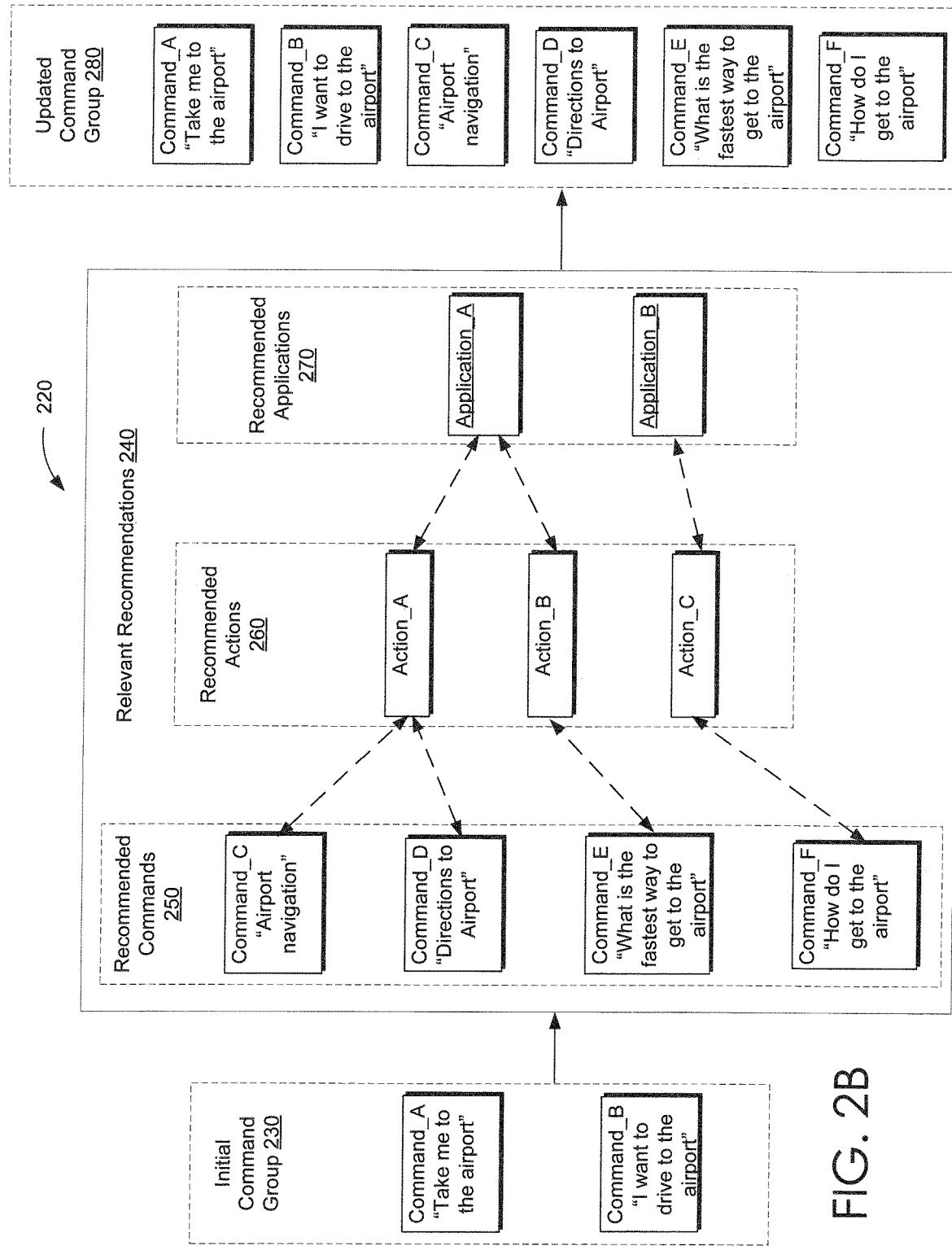
FIG. 2B illustrates one non-limiting embodiment of workflow that is enabled by the relevant action and/or command recommendation engine of FIG. 2A.

That is, these runtime components may provide many of their respective functionalities to assist a user with an on-boarding process when the user is on-boarding one or more actions. For instance, UI component 212 is generally responsible for generating, and controlling one or more UIs that enable a user, such as on-boarding user 134 to carrying out the various processes and/or workflows discussed herein for on-boarding actions. For instance, UI component 212 may generate one or more UIs that a user may employ to on-board actions as discussed herein. FIG. 2B illustrates one non-limiting embodiment of workflow 220 or process that is enabled by ACR engine 200. As such, at least portions of workflow 220 are discussed in conjunction with ACR engine 200, and in particular, the runtime components of ACR engine 200.

Document generator 202 is generally responsible for accessing online content repositories, such as but not limited to content repository 140 of FIG. 1, and generating a plurality of documents based on the accessed content. Each generated document is associated with, or corresponds to a command, or a potential command as discussed herein. That is, each generated document includes a command. A document may additionally include an associated action and application. The associated action and/or application may be included as metadata for the document. As noted above, the document may include contextual content in the document body that provides context for the command. Document generator 202 may generate a document corpus or document database, such as but not limited to document database 136 of FIG. 1. As mentioned above, document generator 202 may access one or more content repositories and generate the document database in one or more offline processes.

Document index generator 204 is generally responsible for employing machine learning (ML) methods to generate document clusters from the documents generated by document generator 202 and stored in a document database. Document index generator 204 may generate a document index, such as but not limited to document index 138 of FIG. 1, based on the document clusters. More particularly, document index generator 204 may employ ML methods to generate a natural language model (NLM) from the document database. For instance, document index generator 204 employs various unsupervised clustering methodologies to generate clusters of documents. The generation of document clusters may enable topic extraction, semantic enhancement, categorization, context understanding, word sense, and semantic disambiguation of the commands associated with the documents. For instance, upon determining one or more clusters that a document may be statistically associated with, the semantics or meaning of the command associated with the document may be reliably inferred. Document index generator 204 may construct a knowledge graph of commands via the document clusters. Document index generator 204 may employ any of the clustering methods discussed in the '573 patent to generate the document clusters and result NLM.

As discussed herein, document index generator 204 embeds each document included in a corpus of documents (e.g., a document database) within a vector space that represents the set of all natural language terms, words, or tokens included in the document database. That is, document index generator may encode each document generated via document generator 202 as a vector. The vector representing a particular document is based on the distribution of terms or words included in the document.

Based on the embedding of documents within the document database, document index generator 204 generates document clusters within the vector space via unsupervised machine learning methods. As discussed herein, each cluster is defined by or characterized by a cluster attractor, or narrow context, i.e., a vector encoding probability distributions of terms that are likely to co-occur within a document included in the cluster. The likelihood that a particular document is included within a particular document cluster may be determined via the Jensen-Shannon (JS) divergence.

Accordingly, in the various embodiments, document index generator 204 may embed each document included in the document database with a vector space and employ ML methods to determine an attractor for each of a plurality of document clusters of the embedded documents. That is, document index generator 204 may cluster commands that are characterized via a command context. Document index generator 204 may generate a document index that preserves the vector embeddings of the documents and the structure of the document clusters. That is, the document index may index documents via the one or more clusters that the document likely is included in. Thus, via the document index, a document may be indexed via the vector embedding of the document and/or one or more document clusters that the document is likely to be included within. As mentioned above, document index generator 204 may generate the document clusters and the document index in one or more offline processes.

UI component 212 is generally responsible for generating one or more UIs to enable a user, such as on-boarding user 134, to interact with ACR engine 200 when on-boarding an action via a runtime workflow, such as but not limited to workflow 220 of FIG. 2B. For instance, UI component 212 may generate a UI that enables a user to provide an initial or seed command group (or command set), such as but not limited to initial command group 230 of FIG. 2B. Initial command group 230 includes two commands: command_A ("Take me to the airport") and command_B ("I want to drive to the airport"). Other initial or seed command groups may include less or more commands.

During workflow 220, the initial command group may be provided to a command searcher, such as but not limited to command searcher 206. Command searcher 206 may employ each of the commands included in the initial command group as a search query. That is, the document index generated by document index generator 204 may be searched with each of the commands acting as a search query. Various embodiments of retrieving clustered documents via a search query are discussed in conjunction the '573 patent. However, briefly here, a search command may be embedded within the vector space via the distribution of terms included in the command. For example, the command may be embedded based on all the terms included in the contextual content of the command. Based on the command's embedding within the vector space, the document index may be used to retrieve documents (and thus other commands) that are embedded within a position of the vector space that are relevant to the command's embedding.

More particularly, during workflow 220, command searcher 206 may employ each of the commands included in the initial command group as a search query. Command searcher 206 retrieves documents from the document index, via various methods described in the '573 patent, based on various relevancy and/or distance metrics described in conjunction with at least processes 300-600 of FIG. 3-6. Each retrieved document is associated with or includes a command. At least a portion of the retrieved documents may be associated with or include an action and application associated with the included command. In some embodiments, all of the retrieved documents are related to an action and application associated with the command. The relevancy of the retrieved command from the search query command is determined via the relevancy and/or distance metrics. One or more of the relevant commands may correspond to or be associated with a relevant action. Each of the relevant actions may correspond to or be associated with relevant applications.

Command searcher 206 may determine relevancy metrics and/or relevancy distances for the various search results, i.e., commands, actions, and applications. Search results analyzer 208 may analyze the search results based on the relevancy metrics and distances and generate relevant recommendations, including relevant commands, actions, and applications. A UI generated by UI component may provide one or more of the relevant commands, actions, or applications to the user as relevant recommendations, such as but not limited to relevant recommendations 240 of FIG. 2B.

As shown in FIG. 2B, relevant recommendations 240 includes recommended commands 250, recommended actions 260, and recommended applications 270. Recommended commands 250 include four recommended commands that are relevant to the commands included in initial command group 230. The four recommended commands include: command_C ("airport navigation,") command_D ("directions to airport,") command_E ("what is the fastest way to get to the airport,"), and command_F ("how do I get to the airport.") Although not shown in FIG. 2B, the various relevancy metrics and distances may be provided to the user via the UI.

As shown via the hashed arrows, each of the recommended commands command_C and command_D are associated with action_A. Recommended command_E is associated with action_B and recommended command_F is associated with action_C. Such associated and/or correspondence may be due to previous on-boardings of actions: action_A, action_B, and action_C. Thus, these actions may also be recommended to the user as recommended actions 260 via the UI.

As shown in in FIG. 2B, recommended action_A and recommended action_B are each associated with application_A. Similarly, recommended action_C is associated with application_B. Each of application_A and application_B may be a navigation application. Based on these associations, application_A and application_B may be recommended to the user via recommended applications 270. Via the UI, the user may select one or more or the recommended commands, actions, or applications. Action on-boarder 210 may update the initial command group to include additional commands based in the user selections. For instance, after action on-boarder 210 has updated the initial command group 230, the updated command group 280 now includes each of the recommended commands: command_D, command_E, and command_F.

Generalized Processes for Assisting Users in On-Boarding Actions

Processes 300-600 of FIGS. 3A-6 will now be discussed. Processes 300-600, or portions thereof, may be performed and/or executed by any computing device, such as but not limited to computing devices 102-120 of FIG. 1, as well as computing device 700 of FIG. 7. Additionally, a relevant action and/or command recommendation (ACR) engine, such as but not limited to ACR engine 132 of FIG. 1 and/or ACR engine 200 of FIG. 2A, may perform and/or execute at least portions of processes 300-600.

Figure 3A:
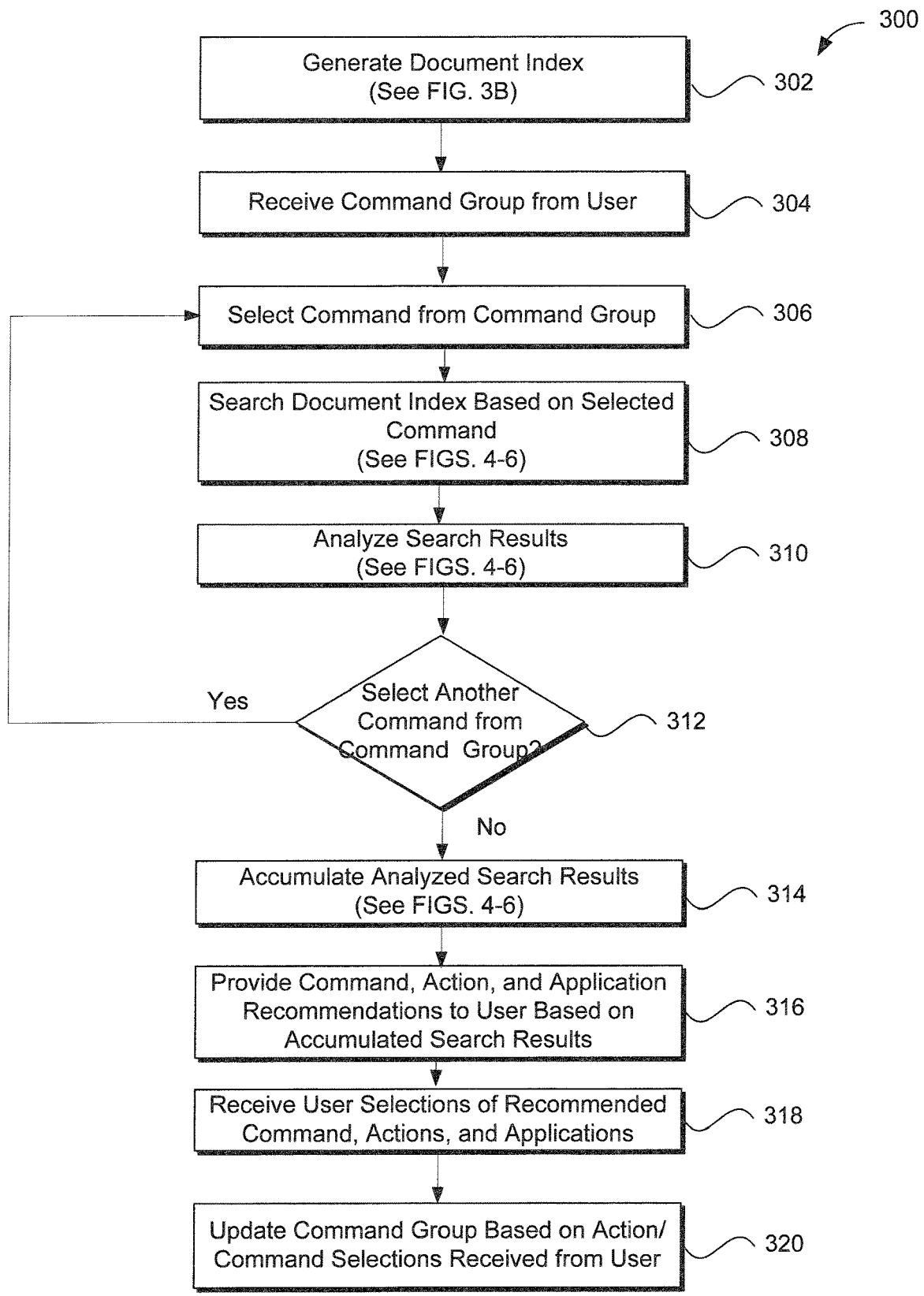
FIG. 3A illustrates one embodiment of a process flow for assisting a user on-boarding an action that is consistent with the various embodiments presented herein.

FIG. 3A illustrates one embodiment of a process flow for assisting a user on-boarding an action that is consistent with the various embodiments presented herein. Process 300 begins at block 302, where a document index is generated. Various embodiments for generating a document index are discussed in conjunction with at least process 340 of FIG. 3B. However, briefly here, a document index generator, such as document index generator 204 of FIG. 2A, may generate document clusters via machine learning clustering methods, such as those described within the '573 patent. Each document in the document clusters may correspond to or be associated with a command or a potential command. At least a portion of the documents may be associated with an action and application that corresponds to the command. In some embodiments, the document index may be generated in an offline process.

At block 304, a command group is received. For instance, a user that is on-boarding an action, such as on-boarding user 134 of FIG. 1, may provide an initial or seed command group, such as but not limited to initial command group 230 of FIG. 2B. A UI provided by an ACR engine, such as but not limited to ACR engine 132 of FIG. 1 and/or ACR engine 200 of FIG. 2B, may enable the user in providing the command set. The received command group may include one or more commands. At block 306, a command from the one or more commands included in the command group is selected. For instance, command_A may be selected from initial command group 230. An action on-boarder, such as action on-boarder 210, may select a command from the received command set.

At block 308, the document index generated at block 302 is searched based on the command selected at block 306. A command searcher, such as but not limited to command searcher 206 of FIG. 2A, may search the document index based on the selected command. Various embodiments of searching the document index based on the selected command are discussed in conjunctions with processes 400-600 of FIGS. 4-6, as well as in conjunction with the '573 patent. However, briefly here, the selected command is employed as a search query for searching the document index. The command is embedded within the vector space that includes the document clusters of the document index, and a plurality of documents included in the document clusters are returned and/or retrieved to generate search results based on the command. As noted above, each document included in the returned search results is associated with a command or a potential command. These commands may be relevant to the selected command. The retrieved documents may include or be associated with actions and applications corresponding to the relevant commands. The search results may be ranked based on relevancy or distance metrics. As noted below, in some embodiments, the entire command group is analyzed as a whole, rather than iteratively as shown in FIG. 3A.

At block 310, the search results are analyzed. A search results analyzer, such as but not limited to search results analyzer 208 of FIG. 2A, may analyze the search results. Various embodiments for analyzing the search results are discussed in conjunction with processes 400-600. However, briefly here, various relevancy metrics scores and distances may be calculated for the commands associated with the documents included in the search results. Actions and applications that are associated with the commands may be determined. Various action and distance scores or metrics may be determined for these relevant actions and applications. The relevant actions and applications may be ranked via corresponding metrics.

At decision block 312, it is decided whether to select another command from the received command group. If there are yet un-selected commands in the command group, it may be decided to select another command from the command group. If all the commands from the command group have already been selected, then it may be decided to not select another command from the command group. If it is decided to select another command at block 312, process 300 may return to block 306 to select another command. For instance, process 300 may return to block 306 to select command_B from command group 330. If it is decided to not select another command from the command group, for example if command_C from initial command group 330 has already been selected, process 300 flows to block 314.

At block 314, the analyzed search results from each of the selected commands are accumulated and/or aggregated. Various embodiments for accumulating search results are discussed in conjunction with processes 300-600. However, briefly here, the search results may be accumulated to generate recommendations. That is, recommendations for relevant commands, actions, and applications may be accumulated at block 314, based on the search results for each of the commands included in the received command group.

At block 316, an indication of the relevant recommended commands, actions, and applications may be provided to the user. That is, the recommended commands, actions, and applications are provided to the user. The recommendations may be provided to the user via a UI provided by the ACR engine. For instance, relevant recommendations 240 of FIG. 2B may be provided to the user for selection via the UI. In some embodiments, the associated relevancy scores, distances, and metrics may be provided to the user at block 316.

At block 318, user selections of the recommended commands, actions, and/or applications are received. For instance, the user may employ the UI to select one or more of the recommendations. At block 320, the user group may be updated to include to selected commands, or any commands that are associated with the recommended applications and actions. Note that each command included in the updated command set may be associated with an action or an application. In various embodiments, an action on-boarder, such as action on-boarder 210 of FIG. 2A, may be employed to update the command set. FIG. 2B shows an exemplary embodiment of an updated command set 280.

Figure 3B:
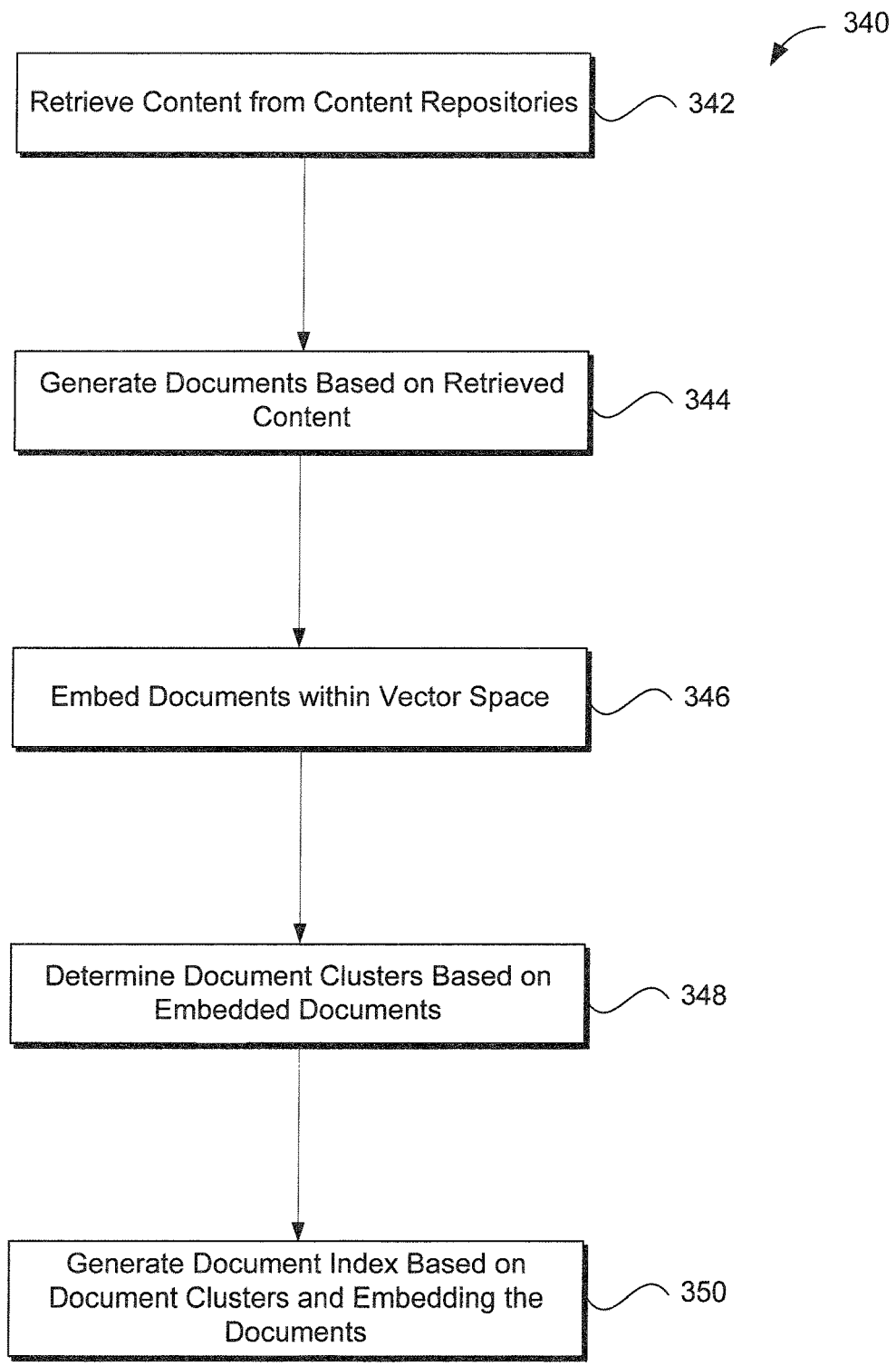
FIG. 3B illustrates one embodiment of a process flow for generating a document index.

It should be noted that although process 300 is illustrated in FIG. 3B as an iterative process via the loop between blocks 306-312, process 300 need not be an iterative process. That is, each command form the command group may be simultaneously selected and analyzed together. For instance, at block 306, each command in the command group may be selected simultaneously. At block 308 and 310, the entire command group is analyzed as a whole, rather than serially as one command at a time. In such embodiments, only a single flow from blocks 306-310 is required.

FIG. 3B illustrates one embodiment of a process flow for generating a document index that is consistent with the various embodiments presented herein. As noted throughout, process 340 may be an offline process. Process 340 begins at block 342, where content is retrieved from one or more content repositories. For instance, a document generator, such as but not limited to document generator 202 of FIG. 2A, may retrieve content from content repository 140 of FIG. 1. At block 344, the document generator generates a plurality of documents, wherein each document is associated with a command or potential command. That is, each document is associated with a phrase, a sentence, a sentence fragments, multiple sentences, or a sequence of natural language words or tokens. At least a portion of the documents may be associated with an action and application corresponding to the included command. As noted throughout, a command may be associated with or related to multiple documents. The documents may be placed in a corpus or document database, such as but not limited to document database 136 of FIG. 1.

At block 346, each document is embedded within a vector space. At block 348, document clusters are determined based on the embedded document. As discussed throughout, each document cluster is characterized by an attractor that includes a narrow context for the cluster. The '573 patent discusses various embodiments of embedding documents within a vector space and determining document clusters defined via a narrow context. At block 350, a document index is generated based on the document clusters and embedding of the documents. A document index generator, such as document index generator 204 of FIG. 2A may embed the documents, determine the document clusters, and generate the document index. For example, document index generator 204 may generate document index 138 of FIG. 1.

Figure 4:
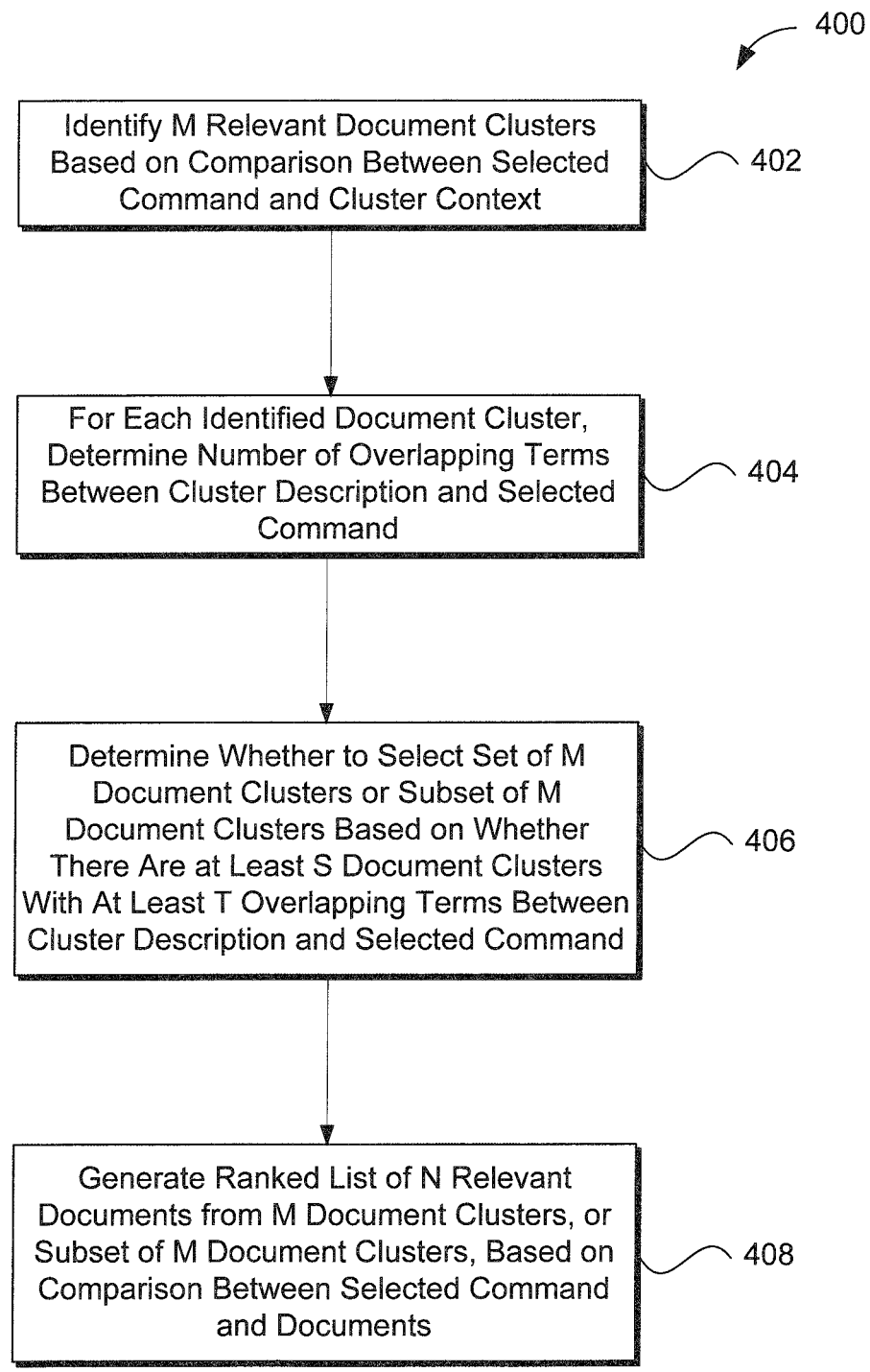
FIG. 4 illustrates one embodiment of a process flow for determining commands that are relevant to an initial command that is consistent with the various embodiments presented herein.

FIG. 4 illustrates one embodiment of a process flow for determining commands that are relevant to an initial command that is consistent with the various embodiments presented herein. Process 400 begins at block 402, where M clusters from the document index are identified based on a command, where M is a positive integer. In various embodiments, the command is the command selected at block 306. The M clusters are relevant to the selected command. The M clusters may be identified based on a comparison of the attractors of the clusters and the selected command.

In at least one embodiment, the comparison includes the determination of the Jensen-Shannon (JS) divergence between the vector embedding of the command and the attractors of the clusters. In some embodiments, the M clusters that are "closest" to the selected command, as indicated by the JS divergence between the command and the clusters' attractors, are identified at block 402. In at least one non-limiting embodiment, M=20.

At block 404, for each of the M identified clusters, the number of terms that are included in both the selected command and the clusters' description is determined. That is, the number of overlapping terms between the command and the cluster's description is determined for each cluster. This determination is disclosed in another application [CITE OTHER APPLICATION], which the content of which are incorporated herein in their entirety. At block 406, it is determined whether to select for further use the set of M document clusters that where identified at block 402, or to select for further use a subset of the M document clusters. The decision is based on whether there are at least S document clusters with at least T overlapping terms between the cluster descriptions and the selected commands, as determined at block 404, where S and T are positive integers. In various non-limiting embodiments, S=3 and T=2.

In the embodiment, when there are at least S document cluster descriptions (from the identified M document clusters) that include at least T overlapping terms with the selected command, each of these at least S cluster document clusters are selected for further use. That is, a subset of the M identified clusters are selected, where the selected subset includes L document clusters, where L is a positive integer and S≤L≤M. If there are not at least S document cluster descriptions that includes at least T overlapping terms with the selected terms, then the entire set of M identified clusters are chosen for further use at block 406.

At block 408, N relevant documents, from the set of L or M document clusters selected at block 406, are identified based on a comparison of the selected command and the selected set of L or M document clusters. The N relevant documents may be identified based on a determination of the JS divergence of the command and each document included in the L or M selected document clusters. For instance, the N "closest" documents to the selected command that are included in the L or M document clusters may be identified. From the N identified documents, a list of N relevant commands is generated. In some embodiments, the number of commands in the list of relevant commands is less than N.

In some embodiments, the number and order of documents related to a relevant command is employed to determine a discounted cumulative gain for the command. This is because each command may be associated with multiple documents. Because each document is associated with a command, the list of commands may be generated via this association. The list of N relevant commands may be ranked by the JS divergence between the selected command and each relevant command's associated document.

Note that each of the N commands may be associated with an action that is associated with an application. Therefore, the list of N commands that are relevant to the selected command may include associated actions and applications. Furthermore, each of the commands included in the list may not be unique because more than one document may be associated with a single command. That is, the ranked list of N relevant commands may include redundancies in of the commands. In various non-limiting embodiments, N=50. In some embodiments, N relevant documents may be identified from each of the L or M clusters. That is, rather than N relevant documents from the set of L or M clusters, a total of L*N or M*N documents may be selected from the clusters at blocks 406 and 408. The remaining discussion may be applied in such embodiments. Thus, 50 documents may be selected from each document cluster identified at block 404.

Figure 5:
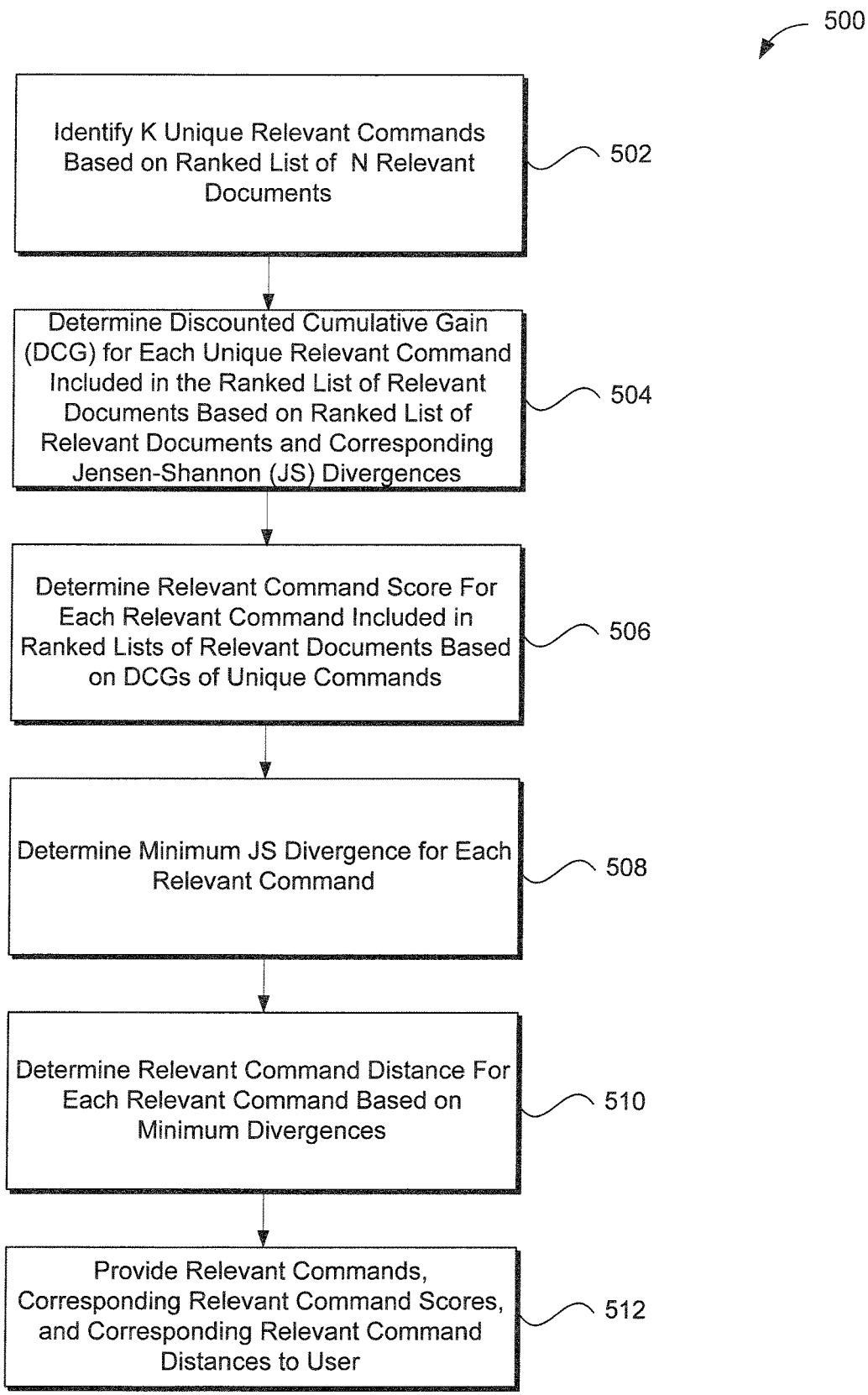
FIG. 5 illustrates one embodiment of a process flow for generating command relevancy metrics for the commands included in the list of FIG. 4 that is consistent with the various embodiments presented herein.

FIG. 5 illustrates one embodiment of a process flow for generating command relevancy metrics for the commands included in the list of FIG. 4 that is consistent with the various embodiments presented herein. Process 500 begins at block 502, where each of the unique commands included in the list of N relevant commands generated at block 408 of process 400 is identified. Because of the potential redundancy in commands in the list generated in block 408, K unique commands are identified, where K is a positive integer such that K≤N.

At block 504, a discounted cumulative gain (DCG) is determined for each of the identified K unique commands based on the ranked list of N relevant commands and the corresponding JS divergence for each instance of the command occurring in the ranked list of relevant commands. Note that the order of the ranked list of relevant documents is based on the JS divergences via block 408, thus the determination of the DCG for a unique command is based on the JS divergences of the documents. The DGC of the commands may be determined based on the position of each instance of each command in the ranked list of N relevant commands. Thus, the DGC of a particular command may be based on the JS divergence of the command as determined via block 408. The DGC of each command may be a normalized DCG (nDCG).

At block 506, a relevant command score is determined for each of the K unique commands. The relevant command score for each of the K unique commands may be based on the various rankings for each instance of each of the K unique commands in the ranked list of N relevant commands. The relevant command score for each of the K unique commands may equivalent to, or at least based on the discounted cumulative gain (DGC) of the commands determined at block 504.

At block 508, a minimum JS divergence is determined for each of the K unique commands. That is, a minimum JS distance for a particular command included in the K unique commands is determined based on the JS divergence (with respect to the command selected at block 306) for each instance of the particular command occurring of the ranked list of N relevant commands. At block 510, a relevant command distance is determined for each of the K unique commands. The relevant command distance may be equivalent to, or at least based on, the determined minimum JS divergence for that command. At block 512, each of the unique relevant commands, corresponding relevant command scores, and corresponding relevant command distances may be provided to the user.

Figure 6:
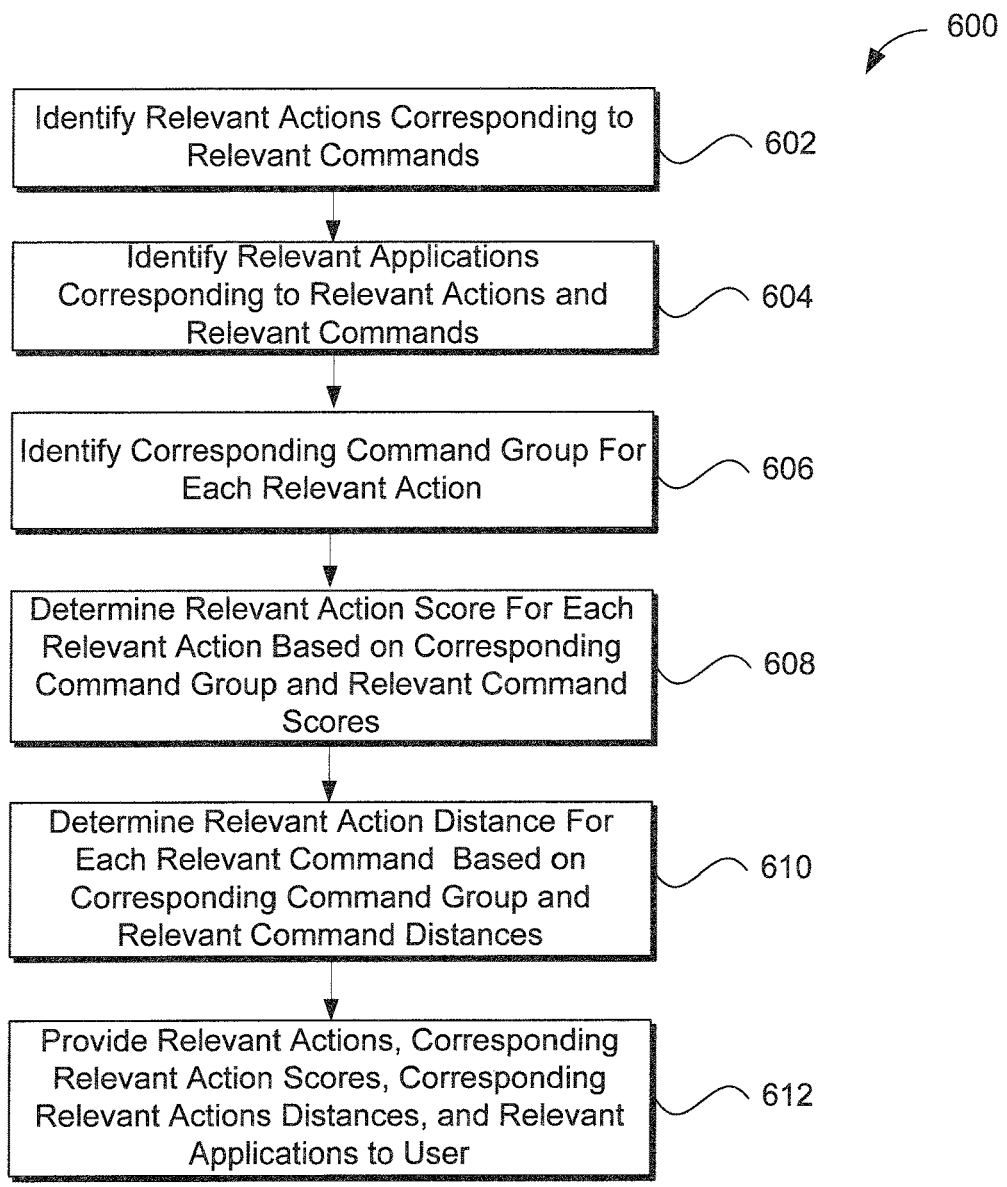
FIG. 6 illustrates one embodiment of a process flow for generating action relevancy metrics that is consistent with the various embodiments presented herein.

FIG. 6 illustrates one embodiment of a process flow for generating action relevancy metrics that is consistent with the various embodiments presented herein. Process 600 begins at block 602, where relevant actions are identified. In various embodiments, a relevant action is determined for each of the K relevant commands. The relevant action for a relevant command is the action that the command is associated with, i.e., the action that is included in, or associated with, a document that includes the relevant command. At block 602, U relevant actions may be identified, where U is a positive integer such that U≤K. U may be less than K because multiple relevant commands may correspond to the same action. At block 604, relevant applications are identified. In the various embodiment, a relevant application is identified for each relevant action and/or relevant command. The relevant application for an action may be an application included in a document that includes the relevant action. At block 604, V relevant applications may be identified, where V is a positive integer such that V≤U. V may be less than U because multiple relevant actions may correspond to the same action. At block 606, the command group is identified for each relevant action. That is, each relevant command that corresponds to a relevant action is determined. Note that different application and different actions may be associated with the same command. For instance, competing ride-share application may both be associated with the command "get me a ride to the airport."

At block 608, a relevant action score for each relevant action is determined. In various embodiments, a relevant action score for a relevant action is based on each of the relevant command scores for the commands that correspond to the action. That is, the relevant action score for a relevant action is based on the relevant command scores for the commands included in the command group associated with the relevant action. In one embodiment, the relevant action score for a relevant action is determined as relevant_action_score=0.5*max(relevant_command_score)+0.5*avg(relevant_command_score). The maximum (max( )) and averaging (avg( )) functions are taken over each relevant command score that corresponds to the relevant action. That is, the max function and avg functions are taken over each relevant command score included in the command group corresponding to the relevant action.

At block 610, a relevant action distance for each relevant action is determined. In various embodiments, a relevant action distance for a relevant action is based on each of the relevant command distances for the commands that correspond to the action. That is, the relevant action distance for a relevant action is based on the relevant command distances for the commands included in the command group associated with the relevant action. In one embodiment, the relevant action distance for a relevant action is determined as relevant_action_dist=min(relevant_command_dist). The minimum (min( )) function is taken over each relevant command distance that corresponds to the relevant action. That is, the min function is taken over each relevant command distance included in the command group corresponding to the relevant action. At block 612, each of the relevant actions, corresponding relevant action scores, corresponding relevant actions distances, and corresponding relevant applications may be provided to the user.

Illustrative Computing Device

Figure 7:
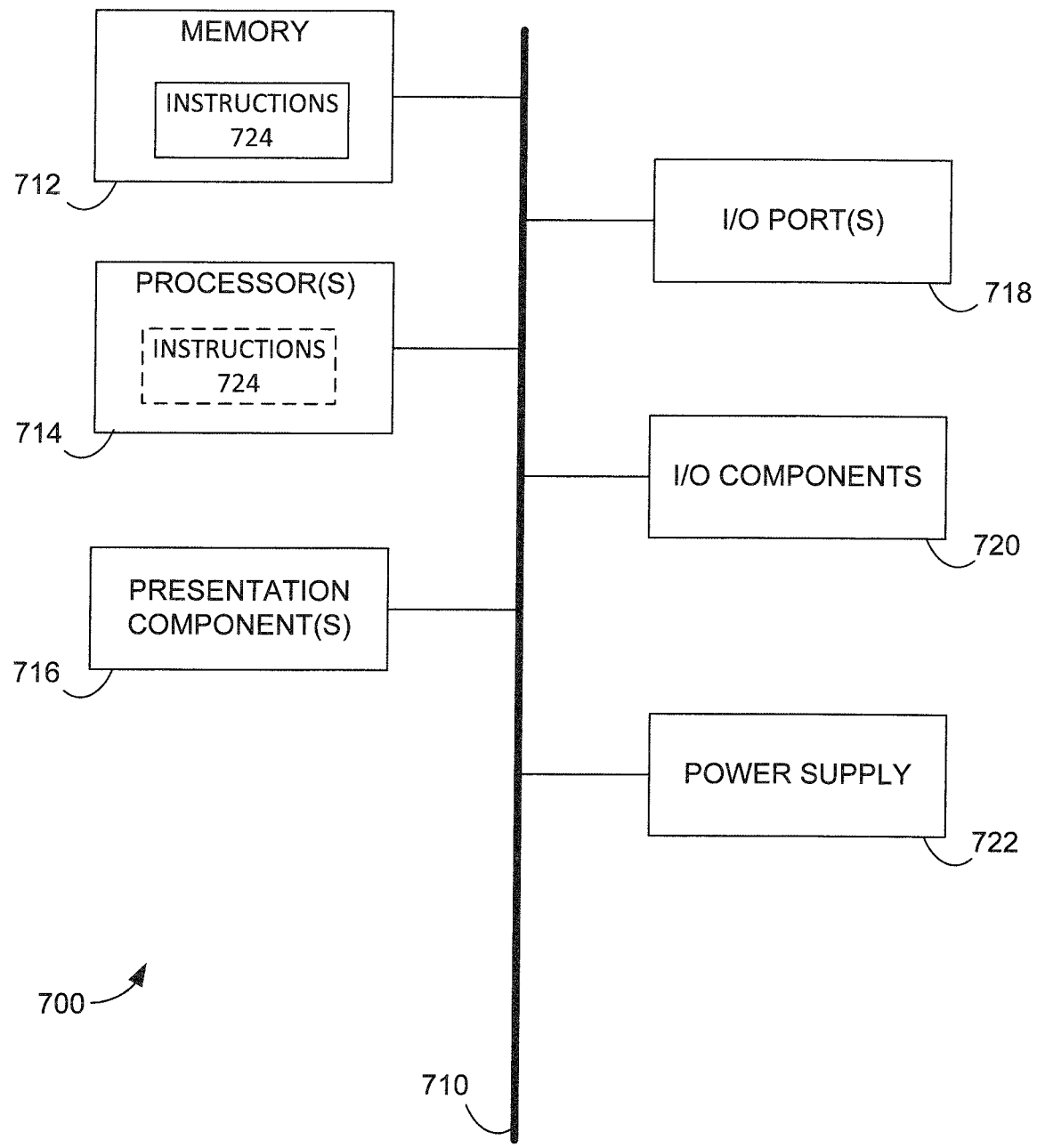
FIG. 7 is a block diagram of an example computing device in which embodiments of the present disclosure may be employed.

Having described embodiments of the present invention, an example operating environment in which embodiments of the present invention may be implemented is described below in order to provide a general context for various aspects of the present invention. Referring to FIG. 7, an illustrative operating environment for implementing embodiments of the present invention is shown and designated generally as computing device 700. Computing device 700 is but one example of a suitable computing environment and is not intended to suggest any limitation as to the scope of use or functionality of the invention. Neither should the computing device 700 be interpreted as having any dependency or requirement relating to any one or combination of components illustrated.

Embodiments of the invention may be described in the general context of computer code or machine-useable instructions, including computer-executable instructions such as program modules, being executed by a computer or other machine, such as a smartphone or other handheld device. Generally, program modules, or engines, including routines, programs, objects, components, data structures, etc., refer to code that perform particular tasks or implement particular abstract data types. Embodiments of the invention may be practiced in a variety of system configurations, including hand-held devices, consumer electronics, general-purpose computers, more specialized computing devices, etc. Embodiments of the invention may also be practiced in distributed computing environments where tasks are performed by remote-processing devices that are linked through a communications network.

With reference to FIG. 7, computing device 700 includes a bus 710 that directly or indirectly couples the following devices: memory 712, one or more processors 714, one or more presentation components 716, input/output ports 718, input/output components 720, and an illustrative power supply 722. Bus 710 represents what may be one or more busses (such as an address bus, data bus, or combination thereof). Although the various blocks of FIG. 7 are shown with clearly delineated lines for the sake of clarity, in reality, such delineations are not so clear and these lines may overlap. For example, one may consider a presentation component such as a display device to be an I/O component, as well. Also, processors generally have memory in the form of cache. We recognize that such is the nature of the art, and reiterate that the diagram of FIG. 7 is merely illustrative of an example computing device that can be used in connection with one or more embodiments of the present disclosure. Distinction is not made between such categories as "workstation," "server," "laptop," "hand-held device," etc., as all are contemplated within the scope of FIG. 7 and reference to "computing device."

Computing device 700 typically includes a variety of computer-readable media. Computer-readable media can be any available media that can be accessed by computing device 700 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 700. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 712 includes computer storage media in the form of volatile and/or nonvolatile memory. Memory 712 may be non-transitory memory. As depicted, memory 712 includes instructions 724. Instructions 724, when executed by processor(s) 714 are configured to cause the computing device to perform any of the operations described herein, in reference to the above discussed figures, or to implement any program modules described herein. The memory may be removable, non-removable, or a combination thereof. Illustrative hardware devices include solid-state memory, hard drives, optical-disc drives, etc. Computing device 700 includes one or more processors that read data from various entities such as memory 712 or I/O components 720. Presentation component(s) 716 present data indications to a user or other device. Illustrative presentation components include a display device, speaker, printing component, vibrating component, etc.

I/O ports 718 allow computing device 700 to be logically coupled to other devices including I/O components 720, some of which may be built in. Illustrative components include a microphone, joystick, game pad, satellite dish, scanner, printer, wireless device, etc.

Embodiments presented herein have been described in relation to particular embodiments which are intended in all respects to be illustrative rather than restrictive. Alternative embodiments will become apparent to those of ordinary skill in the art to which the present disclosure pertains without departing from its scope.

From the foregoing, it will be seen that this disclosure in one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

In the preceding detailed description, reference is made to the accompanying drawings which form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the preceding detailed description is not to be taken in a limiting sense, and the scope of embodiments is defined by the appended claims and their equivalents.

Various aspects of the illustrative embodiments have been described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features have been omitted or simplified in order not to obscure the illustrative embodiments.

Various operations have been described as multiple discrete operations, in turn, in a manner that is most helpful in understanding the illustrative embodiments; however, the order of description should not be construed as to imply that these operations are necessarily order dependent. In particular, these operations need not be performed in the order of presentation. Further, descriptions of operations as separate operations should not be construed as requiring that the operations be necessarily performed independently and/or by separate entities. Descriptions of entities and/or modules as separate modules should likewise not be construed as requiring that the modules be separate and/or perform separate operations. In various embodiments, illustrated and/or described operations, entities, data, and/or modules may be merged, broken into further sub-parts, and/or omitted.

The phrase "in one embodiment" or "in an embodiment" is used repeatedly. The phrase generally does not refer to the same embodiment; however, it may. The terms "comprising," "having," and "including" are synonymous, unless the context dictates otherwise. The phrase "A/B" means "A or B." The phrase "A and/or B" means "(A), (B), or (A and B)." The phrase "at least one of A, B and C" means "(A), (B), (C), (A and B), (A and C), (B and C) or (A, B and C)."

What is claimed is:

1. A computer-readable non-transitory storage medium having instructions stored thereon for providing action on-boarding assistance to a user, which, when executed by a processor of a computing device cause the computing device to perform actions comprising:
   receiving a command group that includes one or more initial commands associated with a new action being on-boarded to a virtual assistant by the user, wherein each of the one or more initial commands includes a sequence of natural language words recognizable by the virtual assistant to execute the new action;
   determining one or more additional commands that are each relevant to the one or more initial commands, wherein the one or more additional commands includes a first command with a first sequence of natural language words that are unrecognizable by the virtual assistant and are determined by employing at least one of the one or more initial commands as a search query to search a plurality of document clusters and each document included in the plurality of document clusters includes a potential command to include in the command group;
   determining one or more command scores for each of the one or more additional commands based on employing the one or more initial commands as a search query;
   providing the one or more additional commands to the user as ranked recommended commands to include in the command group, wherein the ranking of the recommend commands is based on the one or more command scores determined for each of the one or more additional commands; and
   associating the first command with the new action such that the first sequence of natural language words are now recognizable by the virtual assistant to execute the new action.

2. The computer-readable storage medium of claim 1, wherein the actions further comprise:
   in response to receiving a user selection of the first command of the one or more additional commands, updating the command group to include the selected first command of the one or more additional commands, such that the selected first command of the one or more additional commands is associated with the first news action and is recognizable by the virtual assistant to execute the new action.

3. The computer-readable storage medium of claim 1, wherein the actions further comprise:
   determining an action for each of the one or more additional commands, wherein each determined action includes machine executable instructions; and
   providing each determined action to the user as a recommended action.

4. The computer-readable storage medium of claim 3, the actions further comprise:
   determining an action score for each determined action, wherein each action score is based on the determined one or more command scores for the corresponding one or more additional commands;
   determining an action distance for each determined action, wherein each action distance is based on one or more command distances for the corresponding one or more additional commands; and
   providing the action scores and the action distances to the user.

5. The one or more computer-readable storage media of claim 3, wherein the actions further comprise:
   determining an application for each of the actions, wherein each determined application is enabled to execute the machine executable instructions included in the corresponding action; and
   providing each determined application to the user.

6. The one or more computer-readable storage media of claim 1, wherein each command score of the one or more commands scores determined for each of the one or more additional commands is determined based on a discounted cumulative gain (DCG) associated with the corresponding one or more additional commands and the actions further comprise:
   determining a command distance for each of the one or more additional commands, wherein each command distance is based on a Jensen-Shannon (JS) divergence between the documents corresponding to the one or more additional commands and the one or more initial commands; and
   providing the command scores and the command distances to the user.

7. The one or more computer-readable storage media of claim 1, wherein determining the one or more additional commands includes a determination of a number of document clusters that are associated with a plurality of co-occurring words that also occur in the one or more initial commands.

8. A method for providing action on-boarding assistance to a user, comprising:
- receiving a command group that includes one or more initial commands associated with a new action being on-boarded to a virtual assistant by the user, wherein each of the one or more initial commands includes a sequence of natural language words recognizable by the virtual assistant to execute the new action;
- determining one or more additional commands that are each relevant to the one or more initial commands, wherein the one or more additional commands includes a first command with a first sequence of natural language words that are unrecognizable by the virtual assistant and are determined by employing at least one of the one or more initial commands as a search query to search a plurality of document clusters and each document included in the plurality of document clusters includes a potential command to include in the command group;
- determining one or more command scores for each of the one or more additional commands based on employing the one or more initial commands as a search query;
- providing the one or more additional commands to the user as ranked recommended commands to include in the command group, wherein the ranking of the recommend commands is based on the one or more command scores determined for each of the one or more additional commands; and
- associating the first command with the new action such that the first sequence of natural language words are now recognizable by the virtual assistant to execute the new action.

9. The method for claim 8, further comprising:
- in response to receiving a user selection of the first command of the one or more additional commands, updating the command group to include the selected first command of the one or more additional commands, such that the selected first command of the one or more additional commands is associated with the first news action and is recognizable by the virtual assistant to execute the new action.

10. The method of claim 8, further comprising:
- determining an action for each of the one or more additional commands, wherein each determined action includes machine executable instructions; and
- providing each determined action to the user as a recommended action.

11. The method of claim 10, further comprising:
- determining an action score for each determined action, wherein each action score is based on the determined one or more command scores for the corresponding one or more additional commands;
- determining an action distance for each determined action, wherein each action distance is based on one or more command distances for the corresponding one or more additional commands; and
- providing the action scores and the action distances to the user.

12. The method of claim 10, further comprising:
- determining an application for each of the actions, wherein each determined application is enabled to execute the machine executable instructions included in the corresponding action; and
- providing each determined application to the user as a recommended application.

13. The method of claim 8, wherein each command score of the one or more commands scores determined for each of the one or more additional commands is determined based on a discounted cumulative gain (DCG) associated with the corresponding one or more additional commands and the method further comprises:
- determining a command distance for each of the one or more additional commands, wherein each command distance is based on a Jensen-Shannon (JS) divergence between the documents corresponding one or more additional commands and one or the one or more initial commands; and
- providing the command scores and the command distances to the user.

14. The method of claim 8, wherein determining the one or more additional commands includes a determination of a number of document clusters that are associated with a plurality of co-occurring words that also occur in the one or more initial commands.

15. A computing system, comprising:
- a processor device; and
- a computer-readable storage medium, coupled with the processor device, having instructions stored thereon for providing action on-boarding assistance to a user, which, when executed by the processor device, provide the system with an action and command recommendation engine configured to perform actions comprising:
- receiving a command group that includes one or more initial commands associated with a new action being on-boarded to a virtual assistant by the user, wherein each of the one or more initial commands includes a sequence of natural language words recognizable by the virtual assistant to execute the new action;
- determining one or more additional commands that are each relevant to the one or more initial commands, wherein the one or more additional commands includes a first command with a first sequence of natural language words that are unrecognizable by the virtual assistant and are determined by employing at least one of the one or more initial commands as a search query to search a plurality of document clusters and each document included in the plurality of document clusters includes a potential command to include in the command group;
- determining one or more command scores for each of the one or more additional commands based on employing the one or more initial commands as a search query;
- providing the one or more additional commands to the user as ranked recommended commands to include in the command group, wherein the ranking of the recommend commands is based on the one or more command scores determined for each of the one or more additional commands; and
- associating the first command with the new action such that the first sequence of natural language words are now recognizable by the virtual assistant to execute the new action.

16. The computing system of claim 15, the actions further comprising:
- in response to receiving a user selection of the first command of the one or more additional commands, updating the command group to include the selected first command of the one or more additional commands, such that the selected first command of the one or more additional commands is associated with the first news action and is recognizable by the virtual assistant to execute the new action.

17. The computing system of claim 15, the actions further comprising:
- determining an action for each of the one or more additional commands, wherein each determined action includes machine executable instructions; and
- providing each determined action to the user as a recommended action.

18. The computing system of claim 17, the actions further comprising:
- determining an action score for each determined action, wherein each action score is based on the determined one or more command scores for the corresponding one or more additional commands;
- determining an action distance for each determined action, wherein each action distance is based on one or more command distances for the corresponding one or more additional commands; and
- providing the action scores and the action distances to the user.

19. The computing system of claim 17, the actions further comprising:
- determining an application for each of the actions, wherein each determined application is enabled to execute the machine executable instructions included in the corresponding action; and
- providing each determined application to the user as a recommended application.

20. The computing system of claim 15, wherein each command score of the one or more commands scores determined for each of the one or more additional commands is determined based on a discounted cumulative gain (DCG) associated with the corresponding one or more additional commands and the actions further comprising:
- determining a command distance for each of the one or more additional commands, wherein each command distance is based on a Jensen-Shannon (JS) divergence between the documents corresponding to the one or more additional commands and the one or more initial commands; and
- providing the command scores and the command distances to the user.

21. The computing system of claim 15, wherein providing the one or more additional commands to the user reduces an onboarding error rate of the user.

* * * * *